United States Patent [19]

Wright

[11] 4,090,436
[45] May 23, 1978

[54] NONMETALLIC VENT WITH INTEGRAL SCREEN

[75] Inventor: Gordon C. Wright, Charlotte, Mich.

[73] Assignee: MW Industries, Inc., Charlotte, Mich.

[21] Appl. No.: 780,582

[22] Filed: Mar. 24, 1977

[51] Int. Cl.² ............................................. F23L 17/02
[52] U.S. Cl. ........................... 98/66 R; 98/43 R; 98/114
[58] Field of Search ............. 98/42 R, 42.1, 43 R, 98/122, 2.16, 66 R, 61, 121.1, 114; 52/507, 626, 673; 29/160

[56] References Cited

U.S. PATENT DOCUMENTS

| 1,462,607 | 7/1923 | Manrow | 98/114 |
| 1,988,728 | 1/1935 | Green | 29/160 |
| 2,826,136 | 3/1958 | Smith | 98/66 R |
| 3,093,059 | 6/1963 | Metz | 98/42 |
| 3,317,072 | 5/1967 | Zavertnik et al. | 220/327 |
| 3,654,850 | 4/1972 | Berkus | 98/61 |

Primary Examiner—William E. Wayner
Assistant Examiner—R. J. Charvat
Attorney, Agent, or Firm—Beaman & Beaman

[57] ABSTRACT

A nonmetallic two-part vent particularly suitable for mounting upon the roof of recreational vehicles for the venting of appliances, particularly gas refrigerators. The vent includes a base having an integral screen formed of the base material and a cover is directly attached to the base overlying the screen.

3 Claims, 4 Drawing Figures

NONMETALLIC VENT WITH INTEGRAL SCREEN

BACKGROUND OF THE INVENTION

Recreational vehicles often require roof-mounted ventilators for the ventilation of various appliances and a wide variety of vents have been used for the venting of the vehicle interior space, stoves, sanitary systems, exhaust fans and gas refrigerators. The most commonly employed vents are of a sheet metal construction which are of a bulky assembly and difficult to ship, clean and maintain. Also many of the vents presently available have greater vertical dimension than desired and are not capable of providing the venting capacity necessary.

A roof-mounted vent formed of a nonmetallic, synthetic plastic material of a molded construction, as disclosed in U.S. Pat. No. 3,654,850 has been marketed for recreational vehicle use and this construction has the advantage of relatively low cost, low profile and, as the parts are nestable for shipping purposes, freight costs are minimized as compared with one-piece metal vents. However, vents constructed in accord with U.S. Pat. No. 3,654,850 support the cover upon the base upon elongated tabs wherein vibration may occur between the cover and base members, but the greatest deficiency of this construction is the necessity to attach a screen to the base to prevent the entry of leaves, birds and other foreign matter into the vent. In the patented vent the screen must be separately installed in the base by a stapling operation, or the screen is placed upon the recreational vehicle roof and the vent mounted thereon. In either case, the installation of the screen constitutes a separate installation operation, is often improperly accomplished if installed by inexperienced personnel and significantly increases the cost of the complete vent assembly.

SUMMARY OF THE INVENTION

It is an object of the invention to provide a roof-mounted vent suitable for use with recreational vehicles wherein the vent consists only of two parts, yet includes a grid screen which protects the entire vent area opening from the entrance of foreign matter.

A further object of the invention is to provide a two-piece nonmetallic roof-mounted vent which is fully screened and the screen is formed as an integral part of a base member constituting the top panel thereof.

Yet an additional object of the invention is to provide a two-piece nonmetallic vent of high venting capacity and low vertical height consisting of a base and cover, the base having cover-retaining ledges defined thereon receiving and supporting the lower edges of cover portions wherein the cover directly engages the base adjacent the upper base region and fasteners are employed to fix the cover to the base in order to minimize relative movement between the base and cover members after assembly.

In the practice of the invention a nonmetallic base member is injection molded to form a substantially rectangular configuration having side and end walls and an open bottom from which a mounting flange extends. The base member also includes a top panel which is in the form of a grid screen defined by perpendicularly intersecting elements homogeneous with the base member walls.

The cover is of an inverted dish configuration having a closed cover panel extending over the screen in spaced relationship thereto and the cover includes downwardly extending walls which overlie the base configuration and the lower edges of the cover wall rest upon retaining ledges defined upon the end walls of the base member. Fasteners extend through the cover wall and base end wall intermediate the ledges and top panel of the base directly connecting the cover to the base member.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
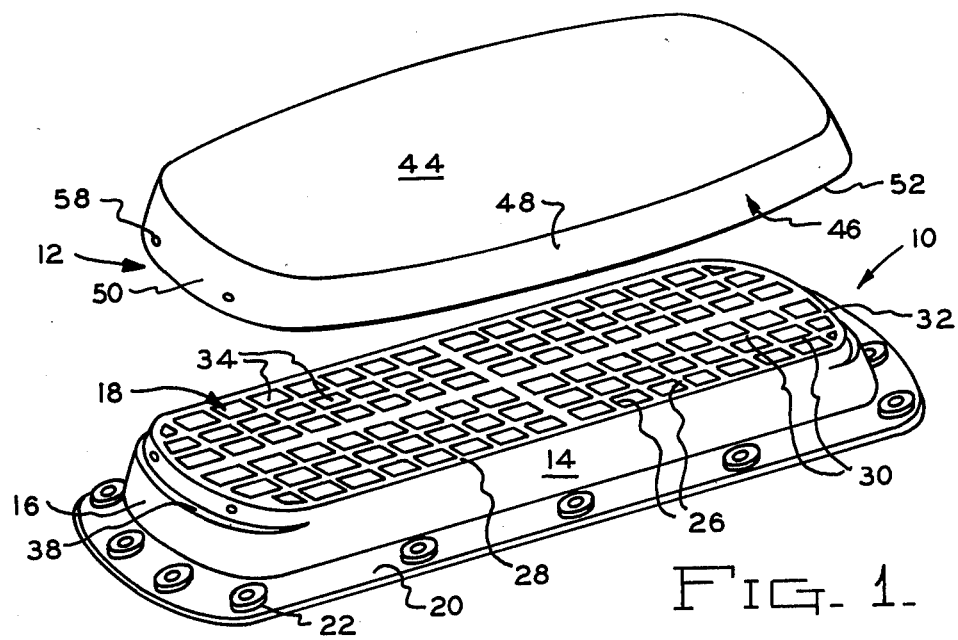
FIG. 1 is an exploded, perspective view of a nonmetallic vent constructed in accord with the invention, the cover being aligned with, and disposed above, the base prior to installation thereon.

The vent in accord with the invention consists of two parts, namely, a base 10 and a cover 12. Both parts are preferably formed of a synthetic plastic material which is relatively rigid having high mechanical strength characteristics, such as polypropylene or polyethylene or ABS, a suitable material being known by the trademark CYCOLAC manufactured by Borg Warner Corporation of Parkersburg, W. Va.

The base 10 includes spaced parallel lateral side walls 14 interconnected at their ends by convex end walls 16. These walls converge in a upward direction and thereby permit a plurality of bases to be nested together for shipping purposes. The base 10 also includes a top panel 18, and at the lower edge of the walls an outwardly extending flange 20 is defined upon which a plurality of embossments 22 are formed each having a hole 24 defined therein for receiving a mounting screw whereby the base may be affixed to the roof of a recreational vehicle, or the like, over a vent opening. As will be apparent from FIGS. 3 and 4, the walls 14 and 16 and flange 20 are relatively thin, approximately ⅛ inch in thickness, and the bottom of the base, as defined by the lower edge of the side and end walls, is open wherein the base may be mounted over a vent opening formed in the roof structure upon which the vent is mounted.

The base top panel 18 comprises a grid screen defined by a plurality of narrow, elongated, parallel, spaced elements 26 extending between the side walls 14 at the upper edge 28 thereof. The screen is further defined by narrow, elongated, spaced, parallel elements 30 extending between the upper edge 32 of the end walls 16 intersecting the elements 26 at right angles, and rectangular openings 34 are defined intermediate the adjacent elements 26 and 30 to define an open grid screen 36.

Figure 2:
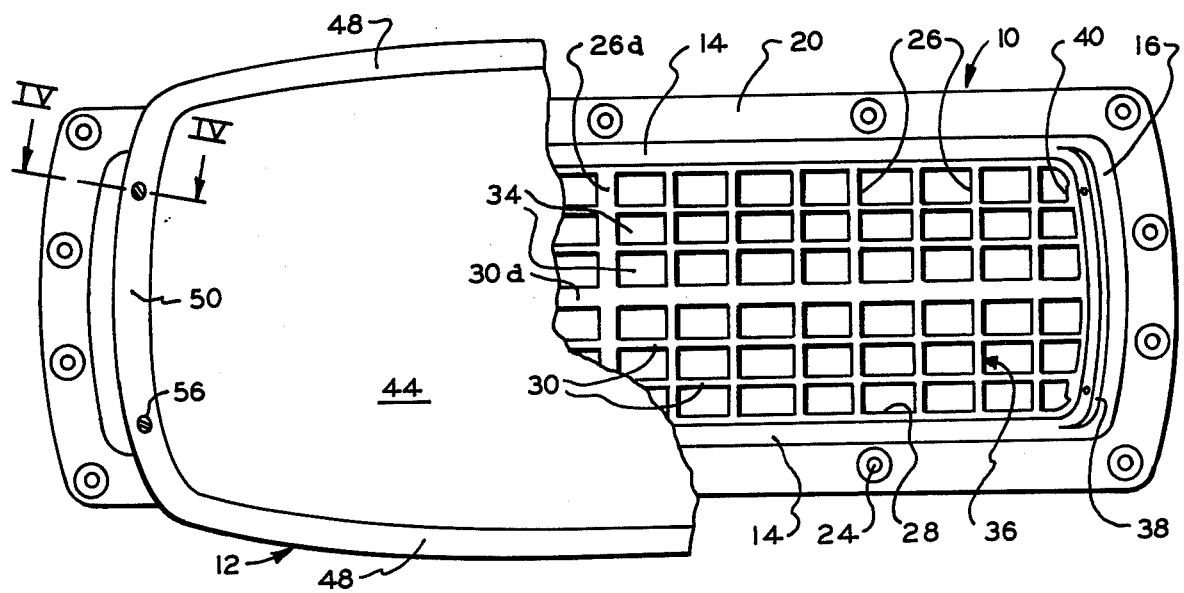
FIG. 2 is a top plan view of the assembled vent, approximately half of the cover being broken away to illustrate the plan configuration of the base.

As will be apparent from FIGS. 1 and 2, a central element 26a extends between sidewalls 14, and a central element 30a extends between end walls 16. The elements 26a and 30a are of a heavy duty character having a greater transverse cross-sectional area than the elements 26 and 30 and serve to strengthen the top panel screen 36, and also function to distribute the base material throughout the injection die during molding as base material is injected into the molding die at the intersection of the elements 26a and 30a.

A ledge 38 is defined upon each base end wall 16 forming an upwardly facing surface upon which the cover 12 is mounted, as will be later described. The ledges 38 define a step in the end walls, as will be appreciated from FIG. 4, and two mounting screw bosses 40 are formed on the interior of each of the end walls intermediate the ledge and the end wall upper edge 32 having a hole 42 defined therein for receiving a mounting screw, as later described.

The cover 12 is formed of the same synthetic material as the base 10 and is of an inverted dish-shape including a cover panel 44 and a downwardly depending wall 46 including sidewall portions 48 and convex end wall portions 50. As will be apparent from FIGS. 3 and 4, the wall 46 diverges in a downward direction wherein a plurality of covers may be nested together for packaging purposes.

Figure 4:
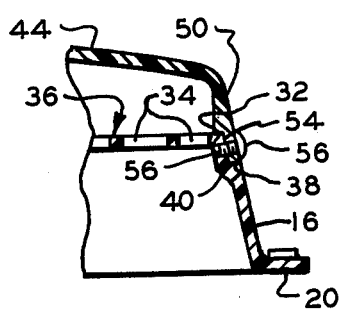
FIG. 4 is a detail, elevational, sectional view of the base end wall and cover end portion in assembled relation as taken along section IV—IV of FIG. 2.
Figure 3:
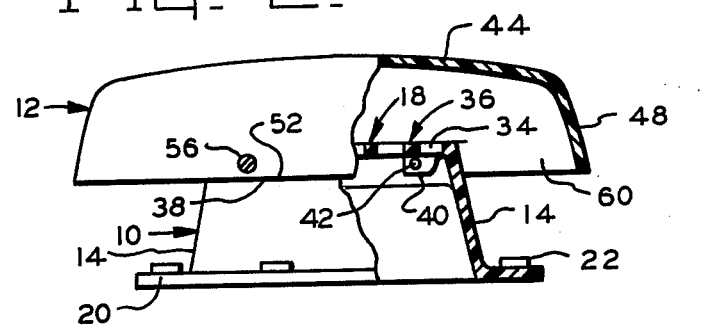
FIG. 3 is an end elevational view of the assembled vent, a portion thereof broken away for purpose of illustration.

The lower edge 52 of the wall 46 is substantially planar, as will be appreciated from FIG. 3, and the spacing between the end wall portions 50 is slightly less than the spacing between the base end walls 16, and the end wall portions include a step 54 whereby the cover 12 may be mounted upon the base 10 such that the end wall portions lower edge 52 engage the base ledges 38, and the cover step 54 intermeshes with the upper edge 32 of the base as apparent in FIG. 4. As the ledges 38 are planar and extend the width of the base end walls 16 a firm positioning of the cover on the base is achieved and the insertion of mounting screws 56 through holes 58 defined in the cover sidewall threaded into base holes 42 firmly attaches the cover to the base in a manner preventing any relative movement between the base and cover.

As will be appreciated from FIG. 3, the height of the cover wall 46, and the location of the ledges 38, is such that a significant vertical spacing exists between the cover panel 44 and the top panel screen 36. Further, the width of the cover as defined by sidewall portions 48 is substantially greater than the width of the top panel 18 and screen and the lower edge 52 of the cover wall extends below the top panel whereby an unrestricted high capacity air flow venting passage 60 is defined between the cover wall 46 and the base sidewalls on both lateral sides of the base.

The fact that the screen 36 comprises the top panel of the base 10 prevents foreign matter from accumulating within the confines of the base, as is the case in those arrangements wherein the screen is attached to the sidewalls below the base upper edge, or is located below the flange 20. Recreational vehicle vents often become clogged by birds and mice building nests therein while the vehicle is stored, and the vent of the invention discourages such activity and, if obstructed, may be easily cleaned by removing the screws 56. Further, the fact that the screen 36 is homogeneously formed during the molding of the base 10 eliminates any need for second operations to attach a screen to the base resulting in lower manufacturing and assembly costs.

It is appreciated that various modifications to the inventive concept may be apparent to those skilled in the art without departing from the spirit and scope of the invention.

I claim:

1. A nonmetallic vent comprising, in combination, an elongated nonmetallic base of generally rectangular configuration having spaced lateral sidewalls interconnected by end walls, a top panel and an open bottom, a peripheral flange extending outwardly from said walls at said open bottom, said top panel consisting of a plurality of spaced, parallel, elongated first elements homogeneously extending from and between said sidewalls and a plurality of spaced, parallel, elongated second elements homogeneously extending from and between said end walls intersecting said first elements, and openings defined intermediate adjacent first and second elements, respectively, wherein said top panel comprises an open grid screen, a nonmetallic cover of an inverted dish configuration having a cover panel and a downwardly depending peripheral wall including side portions and end portions, said end portions closely overlapping said said base end walls adjacent said base top panel, said cover end portions each including a lower edge, a cover supporting ledge defined on each of said base end walls spaced below said top panel and above said flange, said cover end portions lower edges each engaging one of said ledges, fasteners interconnecting said overlapping end portions and end walls mounting said cover on said base with said cover panel in spaced relation to said top panel, said cover side portions being spaced apart a greater distance than said base side walls and overlying said sidewalls and top panel venting said top panel screen.

2. In a nonmetallic vent as in claim 1 wherein said fasteners include screws extending through said cover end portions and said base end walls intermediate said ledges and said top panel.

3. In a nommetallic vent as in claim 1 wherein said first elements include a first centrally located heavy duty element of greater transverse cross section than the remainder of said first elements, and said second elements include a second centrally located heavy duty element of greater transverse cross section than the remainder of said second elements wherein said first and second heavy duty elements strengthen said top panel grid screen.

* * * * *